Nov. 21, 1967     A. FISCHER     3,353,437

DEVICE FOR DRILLING HOLES IN MASONRY WALLS AND THE LIKE

Filed Oct. 14, 1965     2 Sheets-Sheet 1

INVENTOR.

ARTUR FISCHER

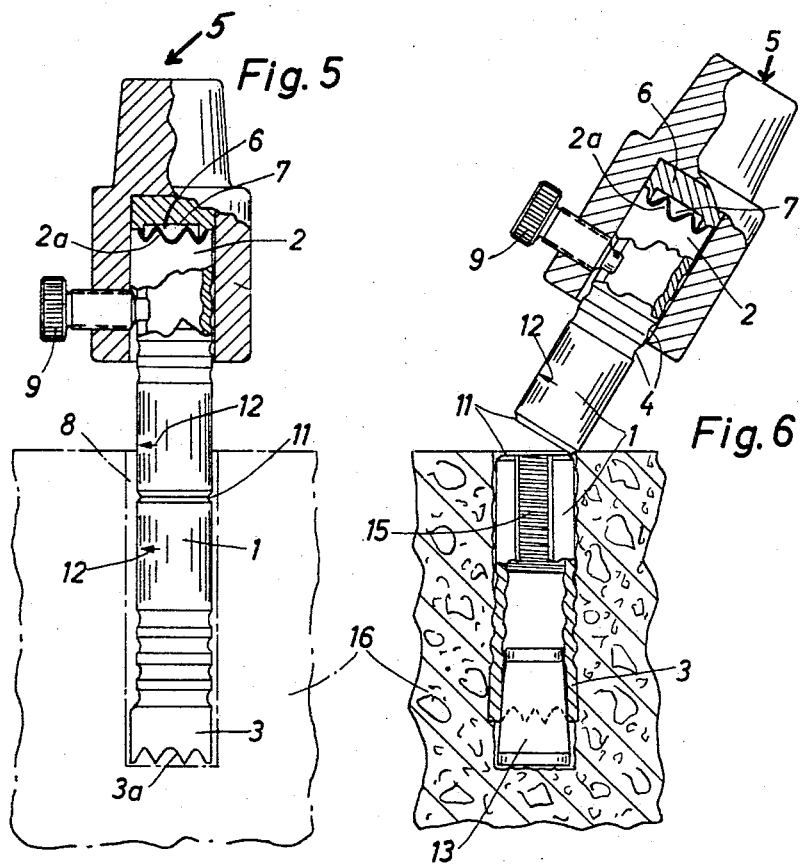

3,353,437
DEVICE FOR DRILLING HOLES IN MASONRY
WALLS AND THE LIKE
Artur Fischer, Tumlingen, Kreis Freudenstadt, Germany
Filed Oct. 14, 1965, Ser. No. 496,057
Claims priority, application Germany, Oct. 14, 1964,
F 44,226
8 Claims. (Cl. 85—68)

ABSTRACT OF THE DISCLOSURE

A drill and expansion anchor in the form of a tubular member having cutting teeth at both ends and a frangible portion intermediate the ends. The device may be broken at the frangible portion and expanded over a plug and function as a screw anchor.

---

The present invention relates to drilling devices. More specifically, it relates to a device for drilling holes in masonry walls and the like. Still more specifically, it relates to a device of the above-mentioned type which may, when it has served its original purpose and lost its usefulness therefor, serve an additional purpose.

Devices for drilling holes in masonry walls and similar structure are of course known. They generally consist of a tubular drill having cutting edges at one end and a suitable holding means, such as a chuck, which engages the other end and on which a force may be applied by a power-driven drill or like implement for the purpose of advancing the tubular drill or tool into the masonry. Such prior art devices are fully operative; however, they suffer from the major drawback that the cutting edges of the tool remain sharp for only a relatively short period of time in view of the nature of the material in which the bore is to be formed, and in that re-sharpening of the cutting edges is not economically feasible. Therefore, the drilling tool in prior art devices of the type under discussion has a rather short life-span and must be discarded once the cutting edges have become blunted.

It is clearly desirable to prolong the useful life of the cutting tool beyond what is now possible. Moreover, it is also desirable to avoid, if possible, complete discarding of the tool when the cutting edges have finally become blunted.

In accordance with what has been said before it is a general object of the present invention to provide a drilling device which overcomes the aforementioned drawbacks.

It is a more specific object of the invention to provide a device for drilling holes in masonry walls and the like which is provided with two independently usable sets of cutting edges.

A still more specific object of the present invention is to provide a device of the type described which incorporates a holder for the drilling tool so constructed as to protect one set of cutting edges while the other is being employed for cutting a bore into a wall or the like.

Still a further object of the invention is to provide a device of the aforementioned character which may, when the sets of cutting edges have both been blunted so that the tool would ordinarily have to be discarded, be further employed in a useful capacity related to its primary purpose.

Briefly stated, my invention consists in the provision of a device for drilling holes in masonry walls and the like, such device including an elongated drilling tool having opposite end portions which are respectively provided with cutting edges. Combined with this drilling tool is a motion-transmitting holder means formed with a recess therein which is so dimensioned as to removably accommodate one of the end portions of the tool, while the other is being used for drilling the hole. The holder means further has a motion-transmitting portion for transmitting to the tool in axial direction thereof force applied to the motion-transmitting portion.

FIGS. 1, 1a and 1b together constitute an exploded view of an embodiment of the invention;

FIG. 4 is a bottom view of a holder means in accordance with the invention;

FIG. 5 is a partly sectioned elevational view of an inventive drilling device with a holder means as shown in FIG. 4; and FIG. 6, in a view similar to FIG. 5, shows the drilling device being separated into two parts for use as wall anchors.

Figure 1A:
Figure 1:
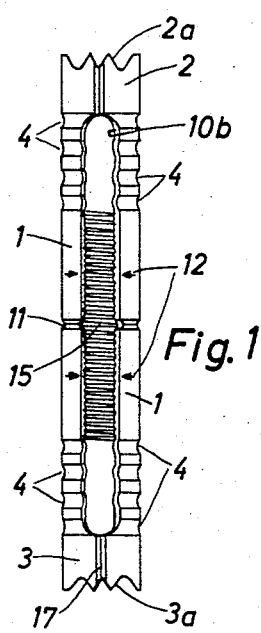

Discussing now the drawing, and firstly FIG. 1, it will be seen that I provide this masonry tool in a known manner in the form of a tubular tool 1 so that chips of masonry which are loosened during the drilling operation may escape through the center of the tube. The tool may be constructed from a rolled-up sheet of suitable metallic material, it may consist of a sliced-off section of a tube, or it may be manufactured from bar stock provided with a central bore therethrough. In any case it will be provided at its opposite ends 2, 3 with cutting edges 2a, 3a which may be selectively employed for drilling a hole in the masonry wall 16 or other like structure. To prevent binding of the tool in the hole I prefer to provide it at its end portions inwardly of the cutting edges with circumferential recesses or grooves 4.

Figure 3:
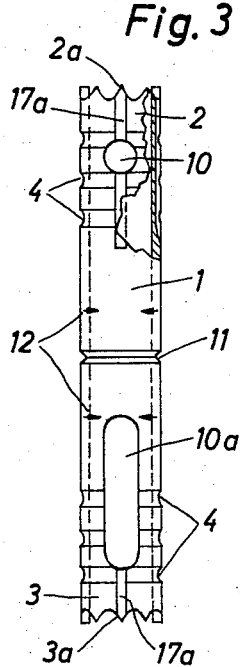
FIG. 3 is a partly sectioned elevational view of another embodiment of the invention.
Figure 1B:
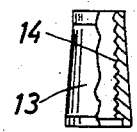
Figure 2:
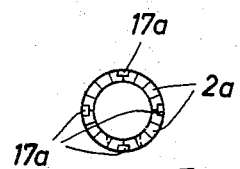
FIG. 2 is an end view of the embodiment shown in FIG. 1.

Since a force must be applied to the tool, such as an axial force exerted by hammering on the free end of the tool or a rotational force exerted by use of the tool in a power drill, it is necessary to provide a holder means 5 (FIGS. 4, 5) for the tool which serves not only to protect that edge portion not currently in use, which of course is the one on which the force is applied, but also to permit rotation of the tool in the bore hole, a motion which is necessary whether or not the tool is driven by a power drill since it is needed to free debris from that cutting edge which is currently in use for drilling purposes. To achieve my purpose of both protecting that cutting edge which is not in use and to couple the drilling tool to the holder means for rotary motion I provide holder means which is formed with a recess 6 so that the free end of the tool can be received therein. The bottom or end wall of this recess is formed in a suitable manner with depressions 7 corresponding exactly to the shape of the cutting edge (2a in the example shown in FIG. 5) of the tool. In other words, if the tool is formed with axially extending cutting teeth, then the bottom or end wall of the recess in the holder means will be formed with complementary depressions in which the cutting teeth may matingly engage. This can be done, for example, prior to hardening of the material of the holder means in that the cutting teeth of the tool are pressed into the material of the holder means, thus forming complementary recesses. Subsequently, the holder means is then hardened to prevent further deformation of the material. However, it is also possible to provide the holder means of a relatively soft material, or to provide an insert forming the end wall of the recess in the holder means and constituted of a relatively soft material, so that the cutting teeth of the drilling tool will form their own complementary recesses when the drilling tool is used for drilling, such as when an axial force is exerted on the holder means and tends to press the teeth of the drilling tool into the relatively soft material. The essential point here is that there must be recesses which are complementary to the cutting teeth so that the latter may be seated in these recesses, and the tool and holder means thereby reliably coupled. I may also additionally provide a suitable fastening means, such as a screw 9 which can extend through the holder from the outside thereof into the recess and which may engage in a recess 10 (FIG. 3) or 10a, 10b (FIGS. 1 and 3) provided in a portion of the drilling tool which is receivable in the holder means. Of course, such recess would then be extending transversely to the axis of the drilling tool and engagement of the screw therein would prevent axial movement of the drilling tool relative to the holder means. In a particularly advantageous embodiment of the invention I will provide the material of the holder means or the insert received in the recess thereof of a consistency harder than that of the drilling tool. Then, if the teeth on the end portion which is received in the recess of the holder means are blunted or even deformed, they will be resharpened at least to a degree, and re-shaped to their proper form by being received in the complementary recesses of the holder means when axial pressure is exerted thereon and thereby on the tool.

However, even the provision of two sets of cutting edges cannot put off indefinitely the time at which the tool is no longer suitable for drilling purposes. In this case I again depart from known concepts in that I do not simply discard the drilling tool, but utilize it for another useful purpose. Specifically, I provide the drilling tool intermediate its ends with a weakened portion 11 so as to permit the tool to be broken off transversely of its axis and thereby to be separated into two halves (see FIG. 6). Each of these halves can then be inserted into the bore 8 just drilled with the drilling tool 1, and can be used as an expansion anchor so as to enable fastening of objects to the wall 16 in which the bore 8 has been formed. It will be clear that heretofore it has been necessary, if an object was to be secured to a masonry wall, to either provide an expansion anchor for the bore provided in the wall or to fill the bore with a cementitious material so as to secure a hook or like implement therein. This is no longer necessary with my inventive device and all that is required to enable the use of the sections thereof as expansion anchors is to make the necessary provisions for separating and securing them. Accordingly, I provide a means for expanding the sections of the drilling tool when they are to be used as expansion anchors. Specifically, I provide a conical or substantially conical member 13 which may be inserted into that section of the tool which is being used as an expansion anchor and which, during its progressive introduction into this section, expands the same into firm frictional contact with the material bounding the bore. Axial slots 17, 17a are provided to facilitate this expansion. Introduction of the conical or substantially conical member into the section finding use as a wall anchor can be accomplished in various ways. For example, I can dispose the conical portion in the bore and then drive the section of the drilling tool into the bore so that its innermost end portion will slide over the conical member and will thereby be forced apart and into frictional contact with the material surrounding the bore. On the other hand, I can provide the interior wall surface of the drilling tool with a thread 15 and can provide another thread 14 in the conical member so that, when both members are disposed in the bore in the wall and I thread a fastener, such as a screw, into the section of the drilling tool and thereafter into engagement with the thread on the conical member, the latter will be drawn into the broken-off section and expand the same. The indicia 12 shown in FIG. 1, for example, are provided to indicate the depth of penetration of tool 1 in wall 16.

It will be understood that each of the elements described above, or two or more together, may also find a useful application in other types of drilling devices differing from the type described above.

While the invention has been illustrated and described as embodied in a drilling device, it is not intended to be limited to the details shown, since various modifications and structural changes may be made without departing in any way from the spirit of the present invention.

I claim:

1. In a tubular device for drilling holes in masonry walls and the like and adapted to be expanded in cooperation with expanding means,
an elongated tubular tool having opposite end portions respectively provided with axially extending cutting teeth, and further having at least one annular recess in its circumferential surface located intermediate said end portion so as to provide a frangible connection, whereby said tool may be separated into two sections respectively usable as expansion anchors for holes drilled with said tool, each of said sections being expansible by expanding means inserted therein.

2. In a device for drilling holes in masonry walls and the like and adapted to be expanded in cooperation with expanding means,
an elongated tubular tool provided with axially extending slot means in a circumferential wall thereof and having opposite end portions respectively provided with axially extending cutting teeth, and further having at least one annular recess in its outer circumferential surface located intermediate said end portions so as to provide a frangible connection, whereby said tool may be separated into two sections respectively usable as expansion anchors for holes drilled with said tool, each of said sections being expansible by expanding means inserted therein.

3. A device as set forth in claim 2 wherein said annular recess is provided substantially midway between said end portions.

4. A device as set forth in claim 3 wherein an inner circumferential surface of said tool is provided with a screw thread extending on opposite axial sides of said annular recess and adapated to mesh with complementary threads on a fastening means when the respective sections of said tool are used as expansion anchors.

5. A device as set forth in claim 2, further comprising indices provided on said outer circumferential surface of said tool for indicating the depth of penetration of said tool into a masonry wall or the like.

6. A device as set forth in claim 1, wherein said expansion means consist of an expansion member insertable into the end portion of the respective section being used as an expansion anchor for expanding the latter.

7. A device as set forth in claim 6, wherein said expansion member is a substantially conical plug, and wherein the section being used as an expansion anchor is expanded into frictional engagement with the wall of said hole by insertion of said plug into the end portion of the respective section.

8. In a device for drilling holes in masonry walls and the like and adapted to be expanded in cooperation with expanding means, an elongated tubular tool having opposite end portions respectively provided with axially extending cutting teeth and being provided intermediate said end portions with aperture means extending transversely of the elongation of said tool and with at least one annular recess in its outer circumferential surface so as to provide a frangible connection, whereby said tool may be separated into two sections respectively usable as expansion anchors for holes drilled with said tool, each of said sections being expansible by expanding means inserted therein;

and holder means having an axial recess therein so dimensioned as to removably accommodate one of said end portions of said tool while the other is being used for drilling said hole, a motion-transmitting portion for transmitting to said tool in axial direction thereof a force applied to said motion-transmitting portion, and retaining means extending through a peripheral wall of said holder means and into said axial recess thereof, said retaining means being arranged to engage said aperture means of said tool for preventing at least axial movement of the latter relative to said holder means.

References Cited

UNITED STATES PATENTS

| | | | |
|---|---|---|---|
| 260,314 | 6/1882 | Parks et al. | |
| 537,044 | 4/1895 | Krauss | 145—120 |
| 1,195,220 | 8/1916 | Hondren | 77—69 |
| 1,964,030 | 6/1934 | Brush | 175—383 |
| 3,123,370 | 3/1964 | Unander | 85—68 |
| 3,180,018 | 4/1965 | Hougen | 77—69 |

FOREIGN PATENTS 425,706   3/1935   Great Britain.

MARION PARSONS, Jr., *Primary Examiner.*